E. E. HANSON & C. MARTINSON.
NUT LOCK.
APPLICATION FILED FEB. 23, 1911.
998,290.
Patented July 18, 1911.
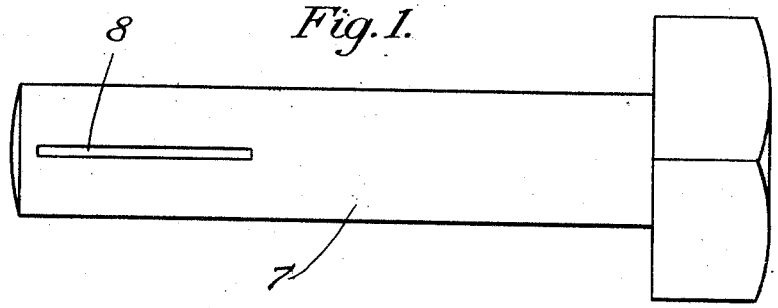
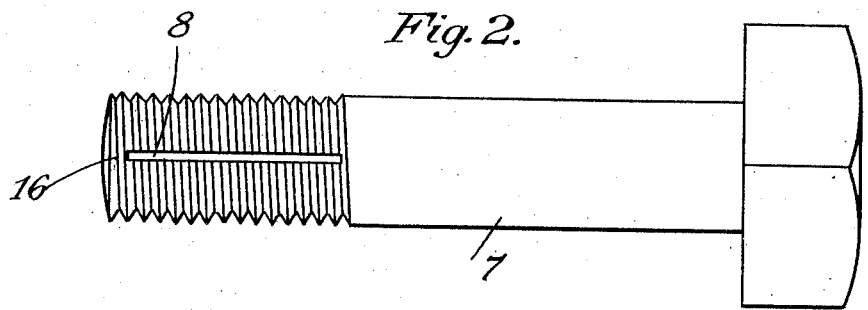
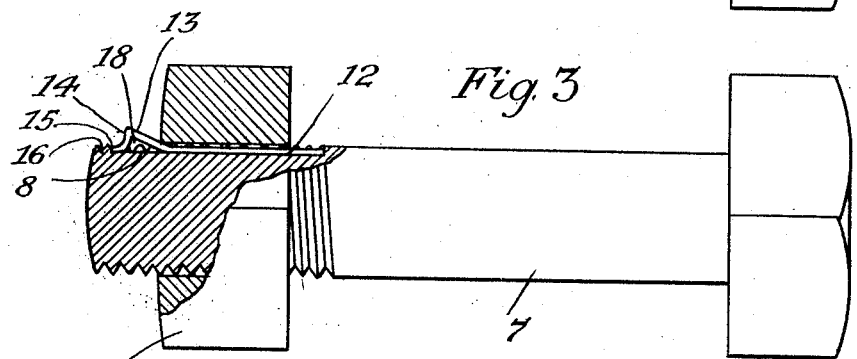
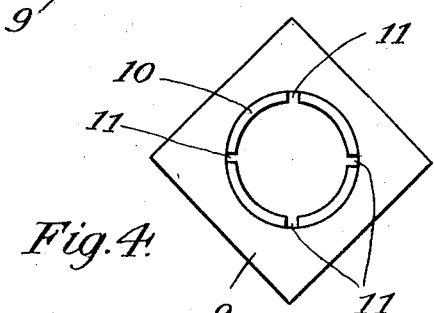
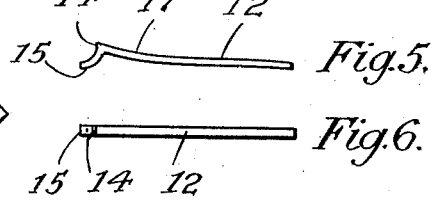
Witnesses:
Thos. Lagaard
C. S. Orvold
Inventors:
Ervie E. Hanson.
Christian Martinson.
By F. A. Whitley
their Attorney.

UNITED STATES PATENT OFFICE.

ERVIE E. HANSON AND CHRISTIAN MARTINSON, OF MINNEAPOLIS, MINNESOTA.

NUT-LOCK.

998,290.     Specification of Letters Patent.     Patented July 18, 1911.

Application filed February 23, 1911. Serial No. 610,124.

*To all whom it may concern:*

Be it known that we, ERVIE E. HANSON and CHRISTIAN MARTINSON, citizens of the United States, residing at Minneapolis, in the county of Hennepin and State of Minnesota, have invented certain new and useful Improvements in Nut-Locks, of which the following is a specification.

Our invention relates to means for locking a nut on its bolt after the same has been screwed into position.

The object of our invention is to provide a device for the above purpose which shall be cheap, simple in construction, easily applied, and adapted to use in relation to ordinary bolts and nuts without special forging or casting, and which will positively lock the nut in position while at the same time the locking means cannot itself become displaced and yet may readily be withdrawn at any time that it may be desired to remove the nut.

Other objects and advantages of our invention will appear in connection with the detailed description thereof and are particularly pointed out in the claims.

In the drawings, representing the application of our invention in one form,—Figure 1 is a view of a bolt having a nut locking slot formed therein before the bolt is threaded. Fig. 2 is a similar view after the bolt has been threaded. Fig. 3 is a view of an assembled bolt and nut, parts of which are in section, showing the locking means in position. Fig. 4 is a plan of a nut grooved for use in connection with our locking device. Figs. 5 and 6 are views of the locking pin.

In the application of our invention we provide the bolt 7, which may be any form of bolt in common use, with a longitudinal slot 8 near the end thereof. This slot may be formed either before or after the threading of the bolt and may be of any suitable cross section either rectangular, round, or otherwise, as desired. Preferably the slot will be formed before the threading of the bolt and will extend to a point a little short of the end of the bolt, so that after the bolt is threaded there will be one of said threads which is not crossed by the slot. The same result may be secured by cutting the slot after the bolt has been threaded so that the same will not intersect the first thread on the bolt, the only object of making the slot before threading being that such a procedure will insure that the first thread will be perfect or uninjured, thus making it impossible that the slot will interfere in any way with the ease of assembling the nut on the bolt.

The nut 9 designed to be used with our locking device will have formed thereon across the threads 10 of said nut one or more slots 11. Four of such slots are shown in the drawings, but a single slot or a different number of slots may be used where desired, the only purpose of supplying a plurality of slots 11 being to make it practicable to make a slot 11 and the slot 8 coincide when the nut 9 is in almost any position of adjustment on the bolt 7.

To coöperate with the slots 8 and 11 and lock the nut in position on the bolt we provide a locking member 12. This member is preferably in the form of a pin, as shown, of the same cross section as that of the opening formed by the slots 8 and 11 when the same are in coincident position on the bolt 7. The member 12 is preferably provided with a raised portion or hump 13 having a flattened head 14 by means of which the member may be hammered into position, and a tail piece 15 for engagement with the single uncut thread 16 on the bolt 7.

In use the nut will be screwed into position on the bolt finally bringing a slot 11 into coincident position with the slot 8. The member 12 will then be driven into the opening formed by these coinciding slots, through the use of a hammer operating upon the head 14. In this manner the tail 15 will be forced over the uncut thread 16. As the member 12 is made of spring material bent somewhat out of the plane of the slots 11 and 8, as indicated at 17, the point of the tail 15 will be sprung down behind the first thread 16, as clearly shown in Fig. 3. The nut will thus be permanently locked in position since the member 12 cannot come out as the same is held in position by the coaction of the tail 15 with the thread 16, the hump portion 13 extending under the edge of the nut 9, thus forming a permanent and very secure holding means. When it is desired to remove the nut, it is only necessary to insert some pointed instrument beneath the loop 18 formed by the hump 13 so as to pry the tail 15 above the thread 16, when the member 12, by means of pincers or otherwise, can readily be withdrawn.

We claim:

1. A nut lock comprising a threaded bolt and a threaded nut in position thereon, said bolt being provided with a slot extending across all of the threads thereof excepting the first thread, said nut being provided with a corresponding slot extending across all of the threads of said nut, and a pin in said slots to lock the nut in position on the bolt having the end thereof extending outside of said nut and engaging said first thread, said exterior portion of the pin being provided with spring means engaging the outer peripheral edge of the bore of the nut to hold the end of the pin locked against said first thread.

2. A nut lock comprising a threaded bolt and a threaded nut in position thereon, said bolt being provided with a longitudinal slot extending across all of the threads thereof excepting the first thread, said nut being provided with a corresponding slot extending across all of the threads of said nut, a pin in said slots having thereon a hump which forms a face by means of which the pin is hammered into position and a loop by means of which the pin may be withdrawn from said slots, and a tail extending beyond said hump to coöperate with said first thread to lock the pin in position in the slots.

3. A nut lock comprising a threaded bolt and a threaded nut in position thereon, said bolt being provided with a longitudinal slot extending across all of the threads thereof excepting the first thread, said nut being provided with a corresponding slot extending across all of the threads of said nut, a pin in said slots having thereon a hump which forms a face by means of which the pin is hammered into position and a loop by means of which the pin may be withdrawn from said slots, a tail extending beyond said hump to coöperate with said first thread to lock the pin in position in the slots, and a spring portion on said pin out of the plane of the end and tail of said pin to coöperate with the edge of the nut to hold the tail in locking engagement with said first thread.

In testimony whereof we have affixed our signatures in presence of two witnesses.

ERVIE E. HANSON.
CHRISTIAN MARTINSON.

Witnesses:
H. A. BOWMAN,
F. A. WHITELEY.

Copies of this patent may be obtained for five cents each, by addressing the "Commissioner of Patents, Washington, D. C."